June 23, 1931. S. M. BAYUS 1,811,704
WIRE CONNECTER OR CABLE CLAMP
Filed July 11, 1930
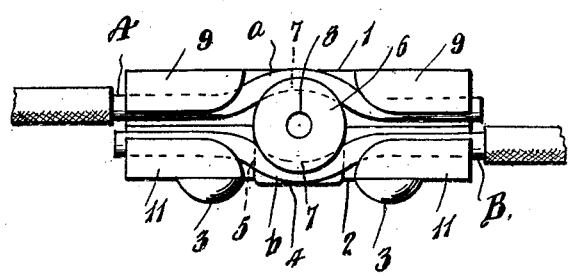
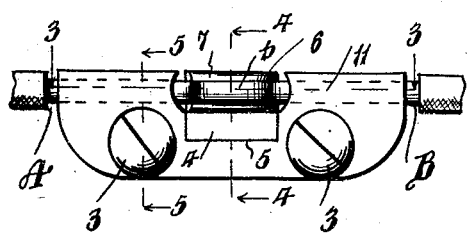 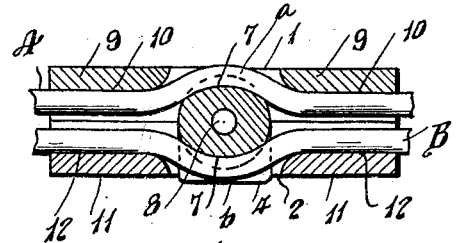
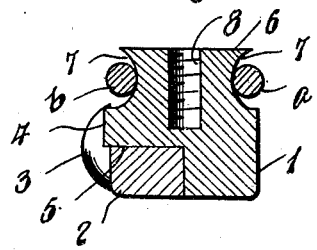 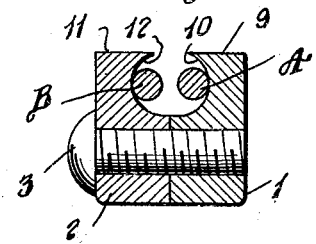
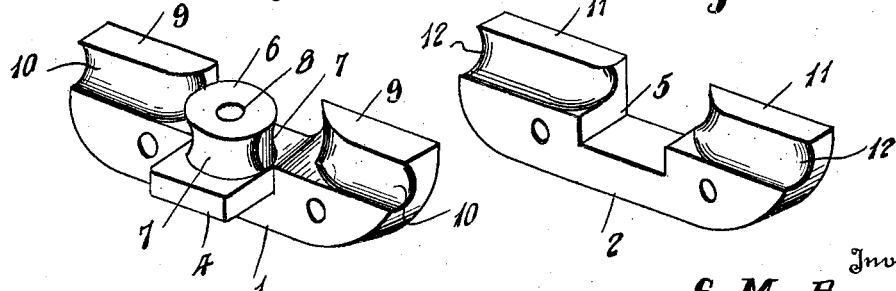
Inventor
S. M. Bayus.

Patented June 23, 1931

1,811,704

UNITED STATES PATENT OFFICE

STEPHEN M. BAYUS, OF BAKERSFIELD, CALIFORNIA

WIRE CONNECTER OR CABLE CLAMP

Application filed July 11, 1930. Serial No. 467,347.

The invention relates to devices for splicing the meeting ends of wires or cables, and has for its object the provision of a device that will securely splice the meeting ends of wires or cables and hold them from relative movement.

A further object of the invention is the provision of a device of the character stated including separable members provided with means to receive the meeting ends of wires or cables and provided with means to kink or bend the meeting ends to prevent relative movement of the ends.

The invention will be described in detail hereinafter and will be found illustrated in the accompanying drawings, in which Figure 1 is a top plan view of the improved wire connecter or cable clamp showing meeting ends of wires spliced together, Figure 2 is a side view in elevation, Figure 3 is a horizontal longitudinal sectional view on a plane indicated by the line 3—3 of Figure 2, Figure 4 is a transverse sectional view on a plane indicated by the line 4—4 of Figure 2, Figure 5 is a similar view on a plane indicated by the line 5—5 of Figure 2, and Figures 6 and 7 are views in perspective of the two members of the clamp.

In the drawings similar reference characters are used to designate corresponding parts throughout the several views.

The improved wire connecter or cable clamp consists of two members designated 1 and 2 respectively and held together by means of screws 3. Members 1 and 2 are as shown elongated blocks, and block 1 has a laterally extending tongue 4 that slidably engages in groove 5. Block 1 is also provided with a post 6 having grooves 7, and a threaded opening 8. The ends of the block 1 on the two sides of the post 6 are provided with upwardly extending offsets or flanges 9, that are grooved as shown at 10, and the ends of block 2 and the two sides of the groove 5 are provided with upwardly extending offsets or flanges 11 that are grooved as shown at 12.

As shown in the drawings, the device is clamping the ends of meeting wires A and B, said wires engaging respectively in the grooves 10 and 12 and are bent or kinked around the post 6, by engaging in the grooves 7 therein, as shown at $a$ and $b$, it being apparent that splicing of the wires is accomplished by engaging the wire A in the block 1 in the position shown in the drawings and laying the end of the wire B on the block 2, before the blocks are assembled, and then by securing the blocks together by means of the screws 3, the bending or kinking of the wires is accomplished, and the meeting ends of the wires will be held securely spliced until released by removing the screws 3 to separate the blocks. The threaded opening 8 is adapted to be used to secure a branch wire to the clamp or connecter should it be desired to provide a lead-off wire from the connected wires.

What is claimed is:—

1. A wire connecter and cable clamp, comprising separable members having oppositely disposed, grooved offsets to receive the meeting ends of wires or cables, and a grooved post on one member arranged between said offsets to kink the wires or cable ends between the offsets on each member, and means to hold the members assembled.

2. A wire connecter and cable clamp, comprising separable members having oppositely disposed, grooved offsets to receive the meeting ends of wires or cables, a laterally extending tongue on one of said members, the other member grooved to receive said tongue, a grooved post on the first member arranged between the offsets to kink the wire or cable ends between the offsets on each member, and means to hold the members assembled.

3. A wire connecter and cable clamp, comprising elongated blocks adjustably engaging one another, a laterally extending tongue on one block, the other block having a groove slidably mounting said tongue, a grooved post on the first block intermediate of its ends, a grooved offset on said block on each side of said post, a grooved offset on the other block on each side of the groove aforesaid, the grooved offsets and post being adapted to receive the meeting ends of wires or cables and the post to kink said wires or cables between the offsets on the respective blocks, and means to secure the blocks in assembled position.

In testimony whereof I affix my signature.

STEPHEN M. BAYUS.